United States Patent [19]
Falckenberg et al.

[11] 3,917,459
[45] Nov. 4, 1975

[54] APPARATUS FOR THE PRODUCTION OF VERNEUIL CRYSTALS

[75] Inventors: Richard Falckenberg, Unterhaching; Herbert Lindner, Munich, both of Germany

[73] Assignee: Siemens Aktiengesellschaft, Berlin and Munich, Germany

[22] Filed: May 13, 1974

[21] Appl. No.: 469,503

[30] Foreign Application Priority Data
May 16, 1973 Germany.............................. 2324783

[52] U.S. Cl.......... 23/273 V; 23/301 SP; 23/273 SP
[51] Int. Cl.²........................................... E01D 9/00
[58] Field of Search ........ 23/273 V, 273 SP, 273 R, 23/DIG. 1, 308 R, 305, 301 R, 301 SP, 301, 300

[56] References Cited
UNITED STATES PATENTS
2,591,561   4/1952   Lester et al...................... 23/273 V
2,792,287   5/1957   Moore et al...................... 23/301 SP Primary Examiner—Norman Yudkoff
Assistant Examiner—Frank Sever
Attorney, Agent, or Firm—Hill, Gross, Simpson, Van Santen, Steadman, Chiara & Simpson

[57] ABSTRACT

Verneuil crystals are produced by directing two reactive gases, such as $O_2$ and $H_2$ downwardly through separate passageways to combine outside a burner tip and ignite into a downwardly directed flame which impinges against the upper end of a seed crystal. One of the gas passageways is divided into two separate branches, one of which carries a portion of a reactive gas and powdered crystalline material to the burner tip for melting and deposition on a seed crystal.

6 Claims, 2 Drawing Figures

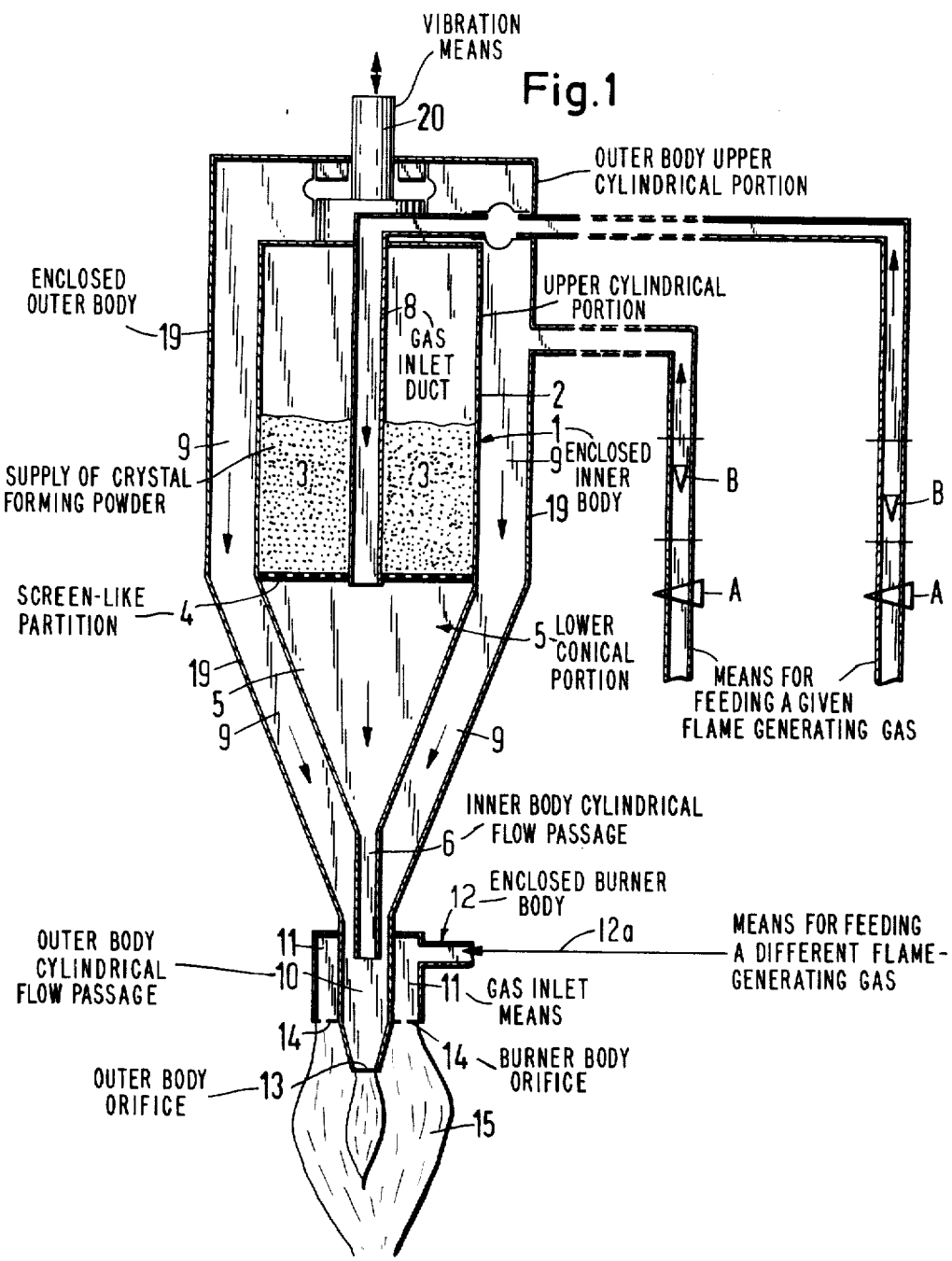

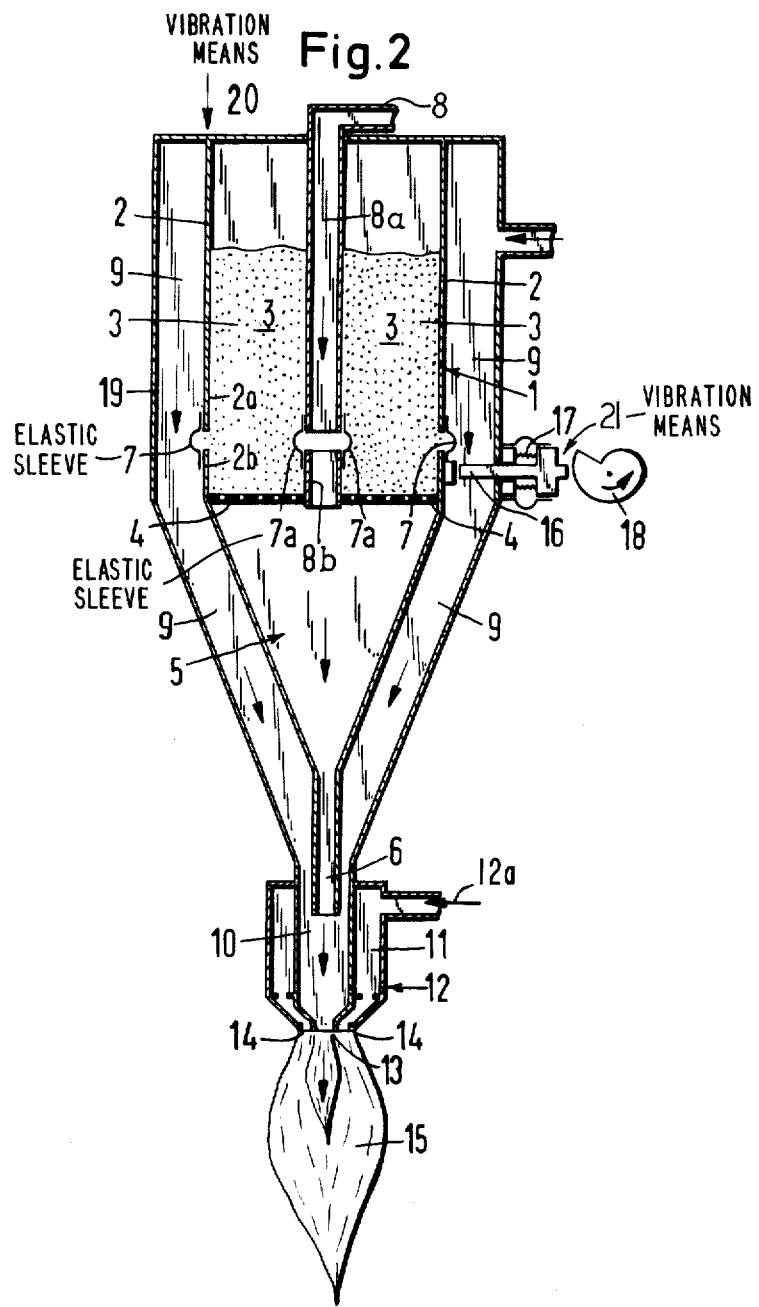

APPARATUS FOR THE PRODUCTION OF VERNEUIL CRYSTALS

BACKGROUND OF THE INVENTION

1. Field of the Invention

The instant invention relates to production of monocrystals and somewhat more particularly to a method and apparatus for producing improved Verneuil crystals.

2. Prior Art

Generally, Verneuil crystals are produced by supplying a powdered crystalline material to a flame which melts the powder and directs the melt to a seed crystal being impinged on by the flame. This process is used to manufacture crystals, such as monocrystals composed of heat-resistant inorganic materials, i.e. metal oxides having relatively high melting points. The seed crystal comprises a monocrystalline body in the form of a rod or disc and is composed of a material which is being manufactured into the Verneuil crystals. During the process, the seed crystal is melted at its top or upper surface by the impinging flame and is gradually withdrawn from the region of the flame while contemporaneously a supply of crystalline material is fed to the melt so that the material progressively crystallizes out of the melt onto the seed crystal and the length of the seed crystal is increased. The newly formed, predominantly monocrystalline material forms the desired crystal. The reactive gases used to generate the flame are primarily hydrogen and oxygen which are separately fed to the burner in approximately stoichiometric proportions so as to combine outside the burner and form an oxy-hydrogen flame. In certain instances, other reactive gases, such as chlorine gas and hydrogen are used to generate the flame. The crystalline powder material which is fed to the top of the seed crystal melt is melted by the flame and within the melt and controllably added so that the volume of the melt remains substantially constant despite the continuing process of crystallization which occurs at the lower end of the melt.

With this type of process, it is necessary to insure that the powdered material is completely molten at least by the time it reaches the melt since solid or unmelted material forms impurity seed crystals in the material being crystallized. The problems associated with this aspect are particularly evident in instances where the molten material has a low surface tension and is an electrical insulator; in other words, when the molten material, in the absence of any electro-magnetic supporting field, can only exist in the form of a thin melt skin. Further, with this type of process, it is necessary to heat the melt as uniformly as possible, which is achieved by controlling the flame so that it burns as smoothly as possible.

In order to insure that the crystalline powder is molten by the time it reaches the seed crystal melt, it is advisable to feed the powder to the melt from a position directly above the flame so that when the powder reaches the melt, it is already preheated and/or melted. However, with this type of arrangement, there is a problem that if the powder drops form its storage magazine into the flame in an irregular or non-controllable manner, the flame will tend to burn irregularly. Further, powder dropping into the reactive gas stream tends to cause pressure waves which cause an irregular burning of the flame. Additionally, in order to provide a smoothly burning flame, it is advisable to dampen or inhibit any turbulence in a gas stream feeding the flame.

SUMMARY OF THE INVENTION

The invention provides a method and apparatus for achieving an improved Verneuil crystal growth process wherein the aforementioned problems and difficulties are overcome.

In accordance with the principles of the invention, each of the two flame-generating reactive gases are separated into independent streams and one of the streams is branched into two separate portions, one of which passes through a storage magazine and entrains crystalline powder therewith. The two separate portions of the one stream are combined just within a burner and the two streams are combined just outside the burner so that any stream velocity components perpendicular to the axis of the gas streams are cancelled by one another and a quiescent smoothly burning flame is generated.

In the practice of the invention, an apparatus is provided which comprises a storage magazine having a bottom perforated screen and a central gas passageway extending vertically through the magazine and terminating at the bottom thereof. A funnel-shaped hopper is attached to the bottom of the magazine for directing powder and gas downwardly into the burner. A hollow housing is mounted concentrically about the magazine and hopper so as to provide a separate gas passageway outside the magazine leading to the burner. The burner is provided with three separate gas passages, a first passage from the bottom of the hopper which carries the crystalline powder and a portion of a first reactive gas, a second passage which carries another portion of the first reactive gas and third passage which carries the second reactive gas. The first gas passage terminates just within the burner, the second gas passage terminates just outside the burner and the third gas passage terminates at the burner orifice.

BRIEF DESCRIPTION OF THE DRAWINGS

FIG. 1 is an elevated schematic view of an embodiment of an apparatus constructed in accordance with the principles of the invention; and FIG. 2 is an elevated schematic view of another embodiment of an apparatus constructed in accordance with the principles of the invention.

DESCRIPTION OF THE INVENTION

The invention provides a method and apparatus for manufacturing Verneuil crystals wherein the crystalline powder fed to the melt at the top of a seed crystal is supplied from a magazine in accordance with the amount of molten material used up by the crystallization or growth occurring at the seed crystal. The controlled feed of the crystalline powder takes place by virtue of the fact that the powder exits from an opening provided at the bottom of the magazine and is fed to the top of the melt so as to be completely molten at least by the time it reaches the melt which is heated by a flame generated by the action of two reactive gases which exit from the tip of a burner toward the melt and react with one another after leaving the burner to produce ignition.

In accordance with the principles of the invention, a first gas stream composed of one of the two flame-generating reactive gases is established so as to flow vertically through a magazine containing crystalline powder whereby a controlled amount of powder is entrained within the first gas stream and carried therewith to a burner nozzle, a second gas stream composed of the same gas as the first gas stream is established concentrically about the first gas stream. At a location still distant from the burner the first and the second gas stream are combined in such a manner that velocity components perpendicular to the vertical axis of the first and the second gas stream at said location are cancelled by both gas streams contacting one another.

A third gas stream composed of a second of the two flame-generating reactive gases is established so as to flow concentrically about the combined first and second gas streams and separate therefrom until the burner orifice whereat it combines with the already combined first and second gas streams and a flame is generated which heats and/or melts the entrained powder so that it is molten at least by the time it impinges on the melt at the top of a seed crystal located below the burner orifice. This manner of combining flame-generating gas streams cancels or inhibits any turbulence therein and produces a smoothly burning downwardly directed flame.

The invention includes an apparatus which comprises a combination of a material (gas and powder) feed means and a burner. The materail feed means comprises a pair of hollow conically tapered bodies concentrically mounted about a vertical axis. The inner body is provided with a powder-retaining screen intermediate its ends and an independent gas passageway along the vertical axis of the body and which terminates at the screen. The outer body surrounds the inner body and provides a gas passageway about the inner body. In this manner, the gas stream passing about the outside of the inner body flows in a rotationally symmetrical fashion in relation to the vertical axis and the gas stream passing through the inner body flows vertically downwardly. The gas stream between the inner and outer bodies has, at all times, a mirror-symmetrical or rotationally symmetrical flow distribution and a velocity component directed toward the axis of the gas stream within the inner body and a vertical component, while any azimuthal velocity component is suppressed. The symmetry of the flow conditions provide a combined gas stream at the junction of the two bodies which virtually exclusively possesses a vertical flow component. This combined gas stream is thus substantially free of any undesirable eddies and/or turbulence. The burner comprises a hollow body having communication at its upper end with the material feed means so as to receive the combined gas streams which carry powder and direct such streams to a tip orifice. The burner is also provided with a lateral gas inlet for a second of the two flame-generating reactive gases which lead to a burner outlet spaced from the tip orifice so that the reactive gases combine only outside the burner.

Referring now to the drawings wherein like elements are designated with like numerals, a powder magazine 1 is provided which consists of a top cylindrical section 2 joined to a tapered bottom section 5, somewhat shaped as a funnel hopper. A screen-like partition 4 extends transversely through the magazine, generally separating sections 2 and 5 from one another. A supply of crystal-forming powder 3, such as composed of a metal oxide, is provided within section 2 and on screen partition 4. The bottom hopper-like section 5 tapers symmetrically about a vertical axis. A gas feed pipe 8 is provided centrally along the vertical axis through the upper section 2 and generally terminates at partition 4. A supply (not shown) of one of the two flame-generating reactive gases, in an exemplary embodiment $O_2$, is operationally connected with pipe 8 so as to provide a stream of the gas through the pipe. The pipe 8 preferably extends down to or to a point above the partition 4 so that the powder 3 is kept from direct contact with a gas stream exiting from pipe 8. The gas stream then flows through section 5 and out of exit orifice 6 at the bottom end of the magazine. During operation of the magazine 1, crystal powder 3 falls from the screen-like partition 4 into hopper 5 and to the orifice 6 whereat it is picked up by the gas stream and entrained therewith through the exit orifice, provided, of course, that by practice of the invention it is insured that the other stream of the same reactive gas which is flowing outside the magazine does not develop a vacuum condition inside the magazine.

Concentrically about magazine 1, particularly about its bottom or hopper-like tapered section 5, a gas flow passageway 9 is provided. Passageway 9 is connected to a supply (not shown) of the gas flowing within pipe 8, i.e., $O_2$ in the exemplary embodiment. The gas streams within pipe 8 and passageway 9 unite at or just prior to the exit orifice 6 of the magazine so that any transverse flow components are largely cancelled and any tendency toward turbulent disruptions of the flow is ihibited.

The flow passage 9 is delineated externally by a hollow housing 19 which concentrically surrounds the external surface of magazine 1 and is open at the bottom so as to communicate with a flow passage 10. Passage 10 extends vertically through a burner 12 and terminates at a tip orifice 13. In this manner, a continuous transition between flow passages 9, 6 and 10 is created. Accordingly, the gas streams traveling through passages 6 and 9, of which 6 includes a charge of crystalline powder, pass, after their union or combination, by the shortest path to the orifice 13 and into the flame 15 burning thereat. The burner 12 is also provided with another gas flow passage 11, which in order to restrict the reaction between the two reactive gases generating flame 15, is completely isolated from passage 10 within the burner. Flow passage 11 is connected to a supply via an inlet means 12a (not shown) of a second of the two reactive gases, in the exemplary embodiment, hydrogen of the oxy-hydrogen flame. The flow passage 11 terminates at an annular nozzle 14 which is spaced a short distance (not more than a few mm) from and concentrically about orifice 13 of passage 10. In this manner, the two reactive gases only come into contact with one another after exiting from the burner. When the reactive gases meet, they ignite and produce the flame 15. The velocities of the gas streams are adjusted so that:

1. the resultant flame burns vertically downwardly, i.e., the tendency of the flame gases to rise is overcome; and
2. the combination of the gas streams at the tip of the burner insures a maximum development of heat; for example, when $O_2$ and $H_2$ are used as the flame-generating reactive gases, the flame is supplied with two mols of $H_2$ and one mol of $O_2$ per unit time and the flow density of the gas from exit orifice 6 is about 0.5 liter/sec·cm$^2$.

In the preferred embodiments, the flow rates of the streams in passages 6 and 9 are so matched with one another so that they are in a ratio of 1 to at least 1.2. In this manner, optimum freedom from turbulence in the stream flowing through passage 10 is achieved.

By following the principles of the invention, the following difficulties which otherwise frequently occur during the production of crystals by the Verneuil method are avoided:

The powder dropping through screen-like partition 4 of magazine 1 tends to, as a consequence of eddies and the like to preferentially deposit on the wall surfaces along the bottom of magazine 1 and on the burner tube 10. After a small time interval, the so-deposited powder detaches itself from the point of accumulation in an avalanchelike fashion. This gives rise to a pressure wave in the gas stream and the wave propagates into the flame burning at the tip of the burner. Since the flame is burning downwardly, it is basically unstable and is therefore quite sensitive to this type of disturbance. As the flame begins to flicker, the heating of the melt becomes irregular or non-uniform and produces imperfections in the crystal being produced. An even worse nuisance which is avoided by the invention is the fact that the avalanche of powder is frequently only partially melted so that some of the solid powder particles are incorporated within the melt and thus contaminating the desired monocrystal. The nature of the powder and gas supply provided in accordance with the principles of the invention leads to a suppression of turbulence, irrespective of whether it is present in the gas stream or has developed as a consequence of the entry of powder into the gas stream. The principles of the invention insure that the flow of materials in the burner and in the flame remain laminar and that the heating is uniform. Also, the danger of having the melt supply receive a too large a quantity of powder, in the form of a powder avalanche, is materially reduced by the principles of the invention.

In order to supply crystalline powder 3 either continuously or in small batches to tube 10, it is frequently necessary to vibrate the magazine 1. A vibration mechanism 20 is mounted in working relation with either the gas pipe 8 or with an upper wall of magazine 1 whereby the vertical vibrations imparted to the pipe and/or magazine are transmitted to partition 4 so as to loosen the powder in contact therewith and allow the loosened powder to fall into the lower hopper-like section 5 and thence into tube 10. In order to adjust the flow conditions within passages 6 and 9, control means A and B (diagrammatically indicated as triangularly-shaped bodies) are respectively provided within the gas inlets communicating with passages 6 and 9. The reactive gas supplies (not shown) may comprise conventional pressurized containers for gas or may be some other suitable gas supply means.

The invention, in its method embodiments and in its apparatus embodiments such as illustrated in FIG. 1 has proven particularly effective in the manufacture of crystals from one or more metal oxides, for example, in the manufacture of monocrystals of Mg-Al-Spinel structures, $Al_2O_3$, ferrites and/or tungstenates.

FIG. 2 illustrates a modified form of the apparatus embodiment which produces further improvements. This form is generally similar to that shown at FIG. 1 but is distinct therefrom in that sections 2 and 5 of magazine 1 are not rigidly connected to one another. As shown, an elastic sleeve 7, such as a sleeve of silicon rubber, loosely joins or associates the sections 2 and 5 with one another. The screen-like partition 4 is associated with and attached to lower section 5. The gas pipe 8 is separated into two sections, an upper section 8a and a lower section 8b, which are joined to one another via an elastic sleeve 7a. The lower section 8b is attached to the screen-like portion 4. A vibration mechanism 20 is provided along a lateral edge of the magazine section 5 to induce horizontal vibrations to partition 4. The mechanism 20 includes an axially movable pin 16 which is periodically reciprocated by a spring 17 and a rotary eccentric 18 so as to exert horizontally acting forces only to the bottom section 5 of the magazine 1.

In order to prevent the development of pressure waves due to vibrations of the magazine, which could propagate through the gas stream and into the flame, it is desirable that the vibrations imparted to the magazine be reduced by horizontally acting tensive and compressive forces and to confine such forces primarily to the bottom section of the magazine. The apparatus illustrated at FIG. 2 accomplishes the foregoing since the bottom section 5 is elastically suspended from the top section 2 and is attached to the screen-like partition so that it can be subjected to horizontally acting forces for more or less periodic shock loadings and in particular vibrations.

In order to reinforce these non-pressure wave producing, powder loosening forces, it is possible to further vibrate the magazine by the application of vertical forces. However, the amplitude of the vertical vibrations should be maintained smaller than that of the horizontal vibrations. The amplitude of the vertical vibrations must at all times be maintained below a magnitude which may cause the flame to gutter or flicker.

The flame is not sensitive to horizontal vibrations of the magazine as long as such vibrations are not transmitted to the burner. Accordingly, when using the apparatus shown in FIG. 1, it is advisable to avoid any rigid connections between the magazine 1 and the burner 12.

In an apparatus of the type shown in FIG. 2, a simple elastic attachment between the bottom section 5 and the top section 2 is provided via sleeve 7 and 7a so that the horizontal vibrations imparted to the bottom of the magazine section can, at most, be transmitted only in a dampened fashion to the top of the magazine section and the amplitude of the horizontal vibration can be maintained very small. In instances where it is desirable to utilize vertical vibrations with the apparatus of FIG. 2, a suitable vibrating mechanism (not shown) may be provided for transmitting vertical forces, diagrammatically indicated by arrow 21 to the top section 2 of magazine 1. When both horizontal and vertical vibrations are used, it is preferable to regulate the respective force-producing mechanisms so that the frequencies of the horizontal vibrations are higher than those of the vertical vibrations. For example, the horizontal vibrations may be controlled so as to have a frequency in the range of about 1 sec.$^{-1}$ to 100 sec.$^{-1}$, which approximately matches the resonate frequency of magazine 1, while the periodic vertical forces may be controlled to have a periodicity about 1 to 10 or 10 to 100 times as long as that of the horizontal forces.

In embodiments which utilize both horizontal and vertical vibrations, it is possible to use a very fine-mesh screen (for example, having a mesh size ranging between 30 to 100 microns) and a powder having an average grain size ranging between 20 and 30 microns and achieve an uninterrupted uniform powder supply.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

We claim as our invention:

1. An apparatus for producing a Verneuil crystal, comprising:

an enclosed hollow outer body having a vertical axis and being defined by an upper cylindrical portion joined to a lower conical portion, said lower conical portion having a cylindrical flow passage at a lower end of said outer body with an orifice communicating with ambient atmosphere and being in concentric relation to said vertical axis, said upper cylindrical portion having a gas inlet means;

an enclosed hollow inner body mounted within said outer body and having a vertical axis in substantial coinciding alignment with the vertical axis of said outer body so as to define a flow passageway between inner walls of said outer body and outer walls of said inner body, said inner body being gas impermeable in relationship to said outer body, said inner body being defined by an upper cylindrical portion joined to a lower conical portion, said inner body having a screen-like partition rigidly attached to interior walls of said inner body at the juncture of said upper and lower portions of said inner body, said inner body having a gas inlet duct mounted concentrically in respect to the vertical axis of said inner body and extending from an upper end of said body to at least said screen-like partition, said lower conical portion of the inner body having a cylindrical flow passage at the lower end of said inner body and extending into said outer body cylindrical flow passage so as to define a coinciding common portion aligned coincidentally with the vertical axis of said outer body, said inner body cylindrical flow passage terminating prior to said orifice of said outer body cylindrical flow passage;

an enclosed burner body attached to said body along the outer body cylindrical flow passage and at a point above said orifice of the outer body cylindrical flow passage; said burner body having an orifice at a lowermost portion of said burner body concentrically encompassing said orifice of the outer body cylindrical flow passage, said burner body having a gas inlet means spaced from said orifice of the outer body cylindrical flow passage;

means for controllably feeding a first flame-generating reactive gas to said gas duct within the inner body and to said gas inlet means within the burner body;

means for controllably feeding second flame-generating reactive gas to said gas inlet means within the outer body;

a supply of crystal-forming powder on said screen-like partition within the inner body; and vibration means positioned in working relation with at least said upper cylindrical portion of the inner body.

2. An apparatus as defined in claim 1 wherein said upper cylindrical portion of the inner body is comprised of an upper section joined to a lower section by an elastic sleeve member, said screen-like partition being rigidly attached only to said lower section and said gas inlet duct within the inner body being comprised of an upper section joined to a lower section by an elastic sleeve member.

3. An apparatus as defined in claim 2 wherein said vibration means is positioned in working relation with said lower section of the upper cylindrical portion of the inner body.

4. An apparatus as defined in claim 1 wherein said gas inlet duct within the inner body is attached to said screen-like partition.

5. An apparatus as defined in claim 1 wherein the orifice of said outer body cylindrical flow passage and the orifice of said burner body are located in an identical plane.

6. An apparatus as defined in claim 2 wherein said vibration means comprises a mechanism producing horizontally directed vibrations and a mechanism producing vertically directed vibrations, said mechanisms including a regulating means for controlling the frequency and intensity of said vibrations so that the horizontally directed vibrations are, in terms of frequency and intensity, about 1 to 10 times greater than the vertically directed vibrations.

* * * * *